United States Patent [19]

Sette et al.

[11] Patent Number: 5,779,499

[45] Date of Patent: Jul. 14, 1998

[54] COMPUTER INTERFACE MULTIPLE INPUT CONNECTING DEVICE

[75] Inventors: Paul R. Sette, Branford; Richard A. Sloan, Jr., Southbury, both of Conn.

[73] Assignee: Pitney Bowes Inc., Stamford, Conn.

[21] Appl. No.: 743,264

[22] Filed: Nov. 4, 1996

[51] Int. Cl.$^6$ ............................................. H01R 13/60
[52] U.S. Cl. ................................. 439/540.1; 439/654
[58] Field of Search ..................... 439/540.1, 638, 439/639, 654, 653

[56] References Cited

U.S. PATENT DOCUMENTS

| | | |
|---|---|---|
| 5,325,491 | 6/1994 | Fasig .................................. 395/325 |
| 5,328,390 | 7/1994 | Johnston et al. .................... 439/638 |
| 5,386,567 | 1/1995 | Lien et al. .......................... 395/700 |
| 5,411,416 | 5/1995 | Balon et al. ....................... 439/540.1 |

Primary Examiner—Gary F. Paumen
Assistant Examiner—Yong Ki Kim
Attorney, Agent, or Firm—Robert H. Whisker; Melvin J. Scolnick

[57] ABSTRACT

Disclosed is a computer interface multiple input connecting device for connecting a plurality of peripheral devices to a computer having a plurality of standard elongate expansion slots provided in a rear wall of the chassis of the computer. The connecting device is composed of a housing having approximately the same thickness as the slots so that it can be mounted to the rear wall of the computer over the slots, and it includes means on a front wall for mounting a plurality of input connector sockets, thereby increasing the number of such sockets that could otherwise be mounted in the expansion slot without the connecting device of the present invention.

5 Claims, 6 Drawing Sheets

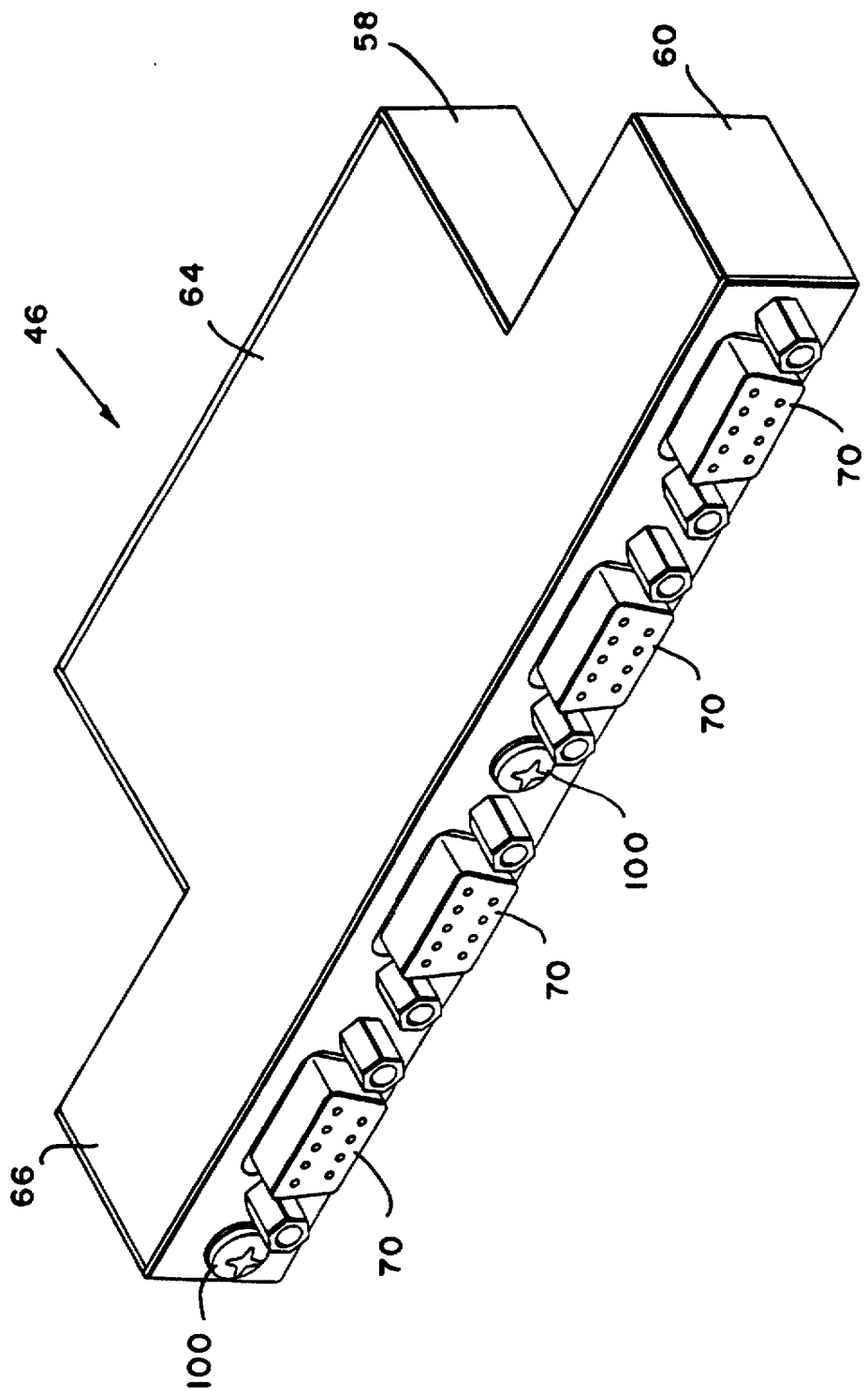

COMPUTER INTERFACE MULTIPLE INPUT CONNECTING DEVICE

BACKGROUND OF THE INVENTION

The present invention relates generally to the field of computer interface devices, and more particularly to a computer interface device for connecting a plurality of peripheral input devices to a computer.

Personal computers have long been well known, and present day computer technology has developed to such a high level of sophistication that these computers can be quite satisfactorily utilized both in carrying out and controlling very involved and complex processes. Many of these processes involve the use of a large number of different types of peripheral equipment which generate various types of data which must be stored in appropriate data bases in the computer, and retrieved and utilized to carry out and/or control certain functions in the overall process.

A typical example of the foregoing is a mail management system designed and marketed by the assignee of this application, in which a centrally located computer is connected to a plurality of mail data stations, each of which includes a postal scale and a postage meter. As each piece of mail is weighed and an appropriate postage indicia is printed thereon, data representing the amount of postage and other information, such as weight, rate, class, destination, etc., is transferred to the computer for storage and retrieval. The data is typically used for such applications as chargeback accounting, mail use performance profiles, etc. A typical installation may include many mail data stations for each computer. Thus, it is apparent that the computer must be provided with suitable connection means which permits all of these items of peripheral equipment to be suitably connected to the computer.

As is well known in the art, personal computers of the type with which the interface connecting device of the present invention are used are provided with a plurality of slots in the rear wall of the computer chassis. These slot were originally provided for the purpose of affording a convenient way of gaining access to various types of interface IO boards in the computer for connecting the computer motherboard to external equipment, such as telephone modems, video equipment, etc.

It was later realized that some of these slots could be used as a convenient location for mounting a plurality of multi-pin connecting sockets to which the corresponding multi-pin connecting plugs of the peripheral devices cold be attached. The practice developed of replacing the solid plates normally used to close the expansion slots with plates having apertures appropriately shaped to fit the connecting sockets, which where suitably attached to the plates such as by screws. A significant problem with this practice is that there is only room in each slot to accommodate two connector sockets across the length of the slot, and since both the size and shape of the connector sockets, as well as the slots, are standard in the industry, there is little likelihood that either would be changed to accommodate more sockets.

A partial solution to the problem is that some computer physical configurations are larger than others and therefore are provided with more slots, although the average is three or four, thereby providing room for six to eight connector sockets. The problem that still remains is that many of the processing installations briefly discussed above may have many more peripheral devices than what can be accommodated by six to eight sockets. Thus, the actual number of sockets required would depend on the particular installation.

Another attempt to solve the problem was the development of a multiple input connecting device which consisted of a rectangular box of fairly large dimensions, approximately six inches long, four inches wide and three inches in depth, which was adapted to be mounted on the rear wall of the computer chassis, and had a face plate large enough to accommodate at least 16 input connector sockets. While this device did provide access in a single unit for connecting 16 peripheral devices to the computer, it was not commercially acceptable due to the difficulty of customizing the box for attachment to the variety of computer chassis configurations that are customarily available today, it to the rear wall of the computer currently available. In addition, the box often could not be made to fit properly on the rear wall of a particular computer chassis because of irregularities in the shape of the rear wall or the rear portion of the computer housing, or because of interference with the location of other input and output ports for connection of power lines, data input devices, printers, modems, etc. As a result, when these problems were encountered, spaces or gaps would be present between the rear face of the box and the rear wall of the chassis which would allow emissions to escape from the computer housing, as a result of which the box could not meet FCC regulations concerning the prevention of the escape of electromagnetic radiation from the computer housing.

It is thus apparent that there is a need for a multiple input connecting device which will effectively solve the foregoing problems of increasing the capacity of the individual slots in the rear chassis wall, and being readily adaptable to any configuration of the rear chassis wall so as not to interfere with operator access to other components, and fit sufficiently tight so as to prevent the escape of harmful emissions from the computer housing.

SUMMARY OF THE INVENTION

The present invention greatly obviates, if not entirely eliminates the shortcomings and disadvantages of various prior art solutions to the foregoing problems, in that it provides a simple and effective way of increasing the number of input connector sockets for each expansion slot on the computer, and does so in manner which provides considerably greater flexibility in the design of multiple input connecting devices to meet the requirements of different computer chassis configurations, and still further does so in a manner which complies with FCC requirements for preventing the emissions of electromagnetic radiation from the computer.

Thus, in its broader aspects, the principles of the present invention are embodied in a computer interface multiple connecting device for connecting a plurality of peripheral devices to a computer having a plurality of standard elongate expansion slots provided in a rear wall of the chassis of the computer. In this environment, the invention comprises a plurality of opposed front and rear, top and bottom and end walls defining a hollow housing which has approximately the same thickness as one of the standard expansion slots in the computer. The housing includes means on the rear wall for connecting the housing to the rear wall portion of the computer chassis adjacent one of the standard expansion slots, and means on the front wall for connecting a plurality of input connector sockets to the housing. With this arrangement, a corresponding plurality of input connector plugs attached to computer peripheral devices can be attached to the input connector sockets on the housing within the space occupied by a single standard expansion slot of the computer.

In some of its more limited aspects, the walls of the housing define a first rectangular housing portion which has a length approximately the same as the length of the expansion slot on the computer, and a second rectangular housing portion which has a length substantially longer than the length of the expansion slot on the computer, and the plurality of input connector sockets are mounted in the second rectangular housing portion. The means for connecting the housing to the rear wall portion of the computer chassis comprises bracket means adapted to be mounted on the inside surface of the rear wall portion of the computer chassis adjacent the expansion slot, and means for removably connecting the rear wall of the first rectangular portion of the housing to the bracket means. This comprises a plurality of elongate connector elements, such as screws, which extend from the front wall of the second housing portion to the rear wall of said first housing portion, and means on the bracket means for operative connection with the connector elements. Further, one or the other of the top and bottom walls includes tubular elements extending from the front wall of the second housing portion to the rear wall of the first housing portion through which the connector elements extend to prevent the connector elements from inadvertently engaging with wires in the housing connected to the input connector sockets.

Having briefly described the general nature of the present invention, it is a principal object thereof to provide a computer interface multiple input connecting device for a computer which increases the number of input connector sockets for each expansion slot on a computer in a highly simple and effective manner.

Another object of the present invention is to provide a computer interface multiple input connecting device which provides sufficient flexibility in design to accommodate the large number of variations in computer chassis configurations in which computers are manufactured.

Still another object of the present invention is to provide a computer interface multiple input connecting device which can be mounted on different computer chassis configurations sufficiently tight to afford complete protection against the escape of harmful emissions from the computer housing.

It is another object of the present invention to provide a computer interface multiple input connecting device which is inexpensive to manufacture, can be easily installed by field service personnel, and requires no maintenance.

These and other objects and advantageous features of the present invention will be more apparent from an understanding of the following detailed description of presently preferred embodiments of the invention when considered in conjunction with the accompanying drawings.

BRIEF DESCRIPTION OF THE DRAWINGS

FIG. 6 is a view similar to FIG. 3 showing a modified form of the computer interface multiple connecting device of the present invention.

DETAILED DESCRIPTION OF THE PREFERRED EMBODIMENTS

Figure 1:
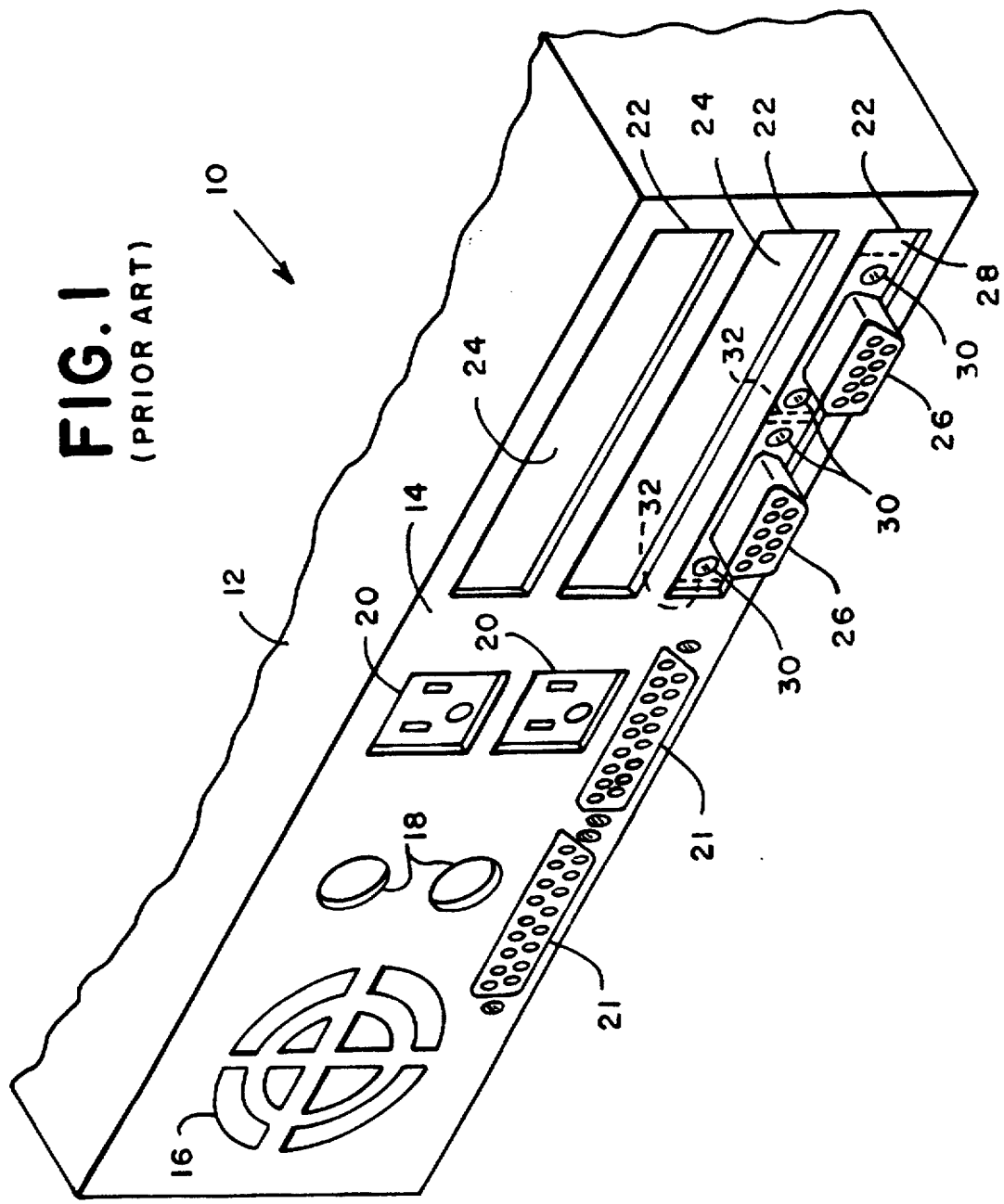
FIG. 1 is a fragmentary perspective view of a typical computer showing the rear wall portion of the chassis of the computer, and illustrating one standard prior art method of mounting multiple input connecting devices on the rear wall.

Referring now to the drawings, and particularly to FIG. 1 thereof, the reference numeral 10 designates generally a portion of a standard PC type computer, of which many varieties are available for both general purpose and specialized applications. The computer 10 for which the connecting device of the present invention has been designed is more in the nature of a special purpose computer which is used in conjunction with relatively complex data processing systems of one type or another, of which the above briefly described mail management system is but one example. Typically, these systems involve many pieces of peripheral equipment which generate data relating to the data processing system, which data must be fed into the computer for storage in appropriate data bases and for retrieval and use in controlling various operations that are part of the data processing system.

The computer 10 shown in the drawings is intended to be merely illustrative of the many different configurations of such computers that are available. Typically, these computers include a housing 12 for enclosing all of the printed circuit boards, electronic components, memory device drives, hard wiring and miscellaneous other electrical and electronic devices and components that make up the computers. The computer 10 also includes a chassis, which is an internal frame to which all of the foregoing parts and components are attached, the chassis typically including a rear wall 14 which extends across the back of the housing 12. It must again be emphasized that the shape of the wall 14 shown in FIG. 1 is merely representative of a great variety of configurations that are available in computer design, and the manner in which it is shown is intended to illustrate the manner in which the device of the present invention interfaces between the computer and the above mentioned peripheral devices.

The rear wall 14 would typically include a suitable opening 16 for a cooling fan inside the housing 12, various input ports 18 for dedicated input devices such as keyboards, scanners, etc., one or more high voltage connections 20 for power input or output, and one or more multi-pin output connectors 21 for other dedicated devices such as monitors and printers. All of these components, ports and connectors are suitably mounted on the rear wall 14, and need not be further described since they form no part of the present invention.

The rear wall 14 of any computer chassis also includes a plurality of expansion slots 22. When not in use, the slots 22 are covered by plates 24 which are connected to the inside surface of the slots 22 in a suitable manner so that the slots 22 are effectively tightly sealed to prevent both electromagnetic emissions from escaping from the housing 12 and dust and other atmospheric contaminants from entering the housing 12.

FIG. 1, illustrates the earliest prior art solution to the problem of providing multiple input connecting devices for peripheral equipment which provides data to the computer 10. Thus, it will be seen that the slots 22 are used to provide a convenient location for mounting multi-pin input connector devices 26, which are well known in the art and are available in a variety of pin sizes. The connecting devices 26 are merely sockets having a plurality of apertures into which a corresponding number of pins mounted in a mating plug are inserted, with both the apertures on the socket and the pins on the plugs being connected to wires, typically in the well known form of flexible cable. The sockets 26 are secured to a plate 28 as by screws 30 which pass through apertures in mounting plates 32 which are suitably connected to the sockets 26. As seen in FIG. 1, two of the smallest standard size of sockets 26 occupy substantially an entire slot 22, with the result that the rear wall 14 of the computer chassis 12 shown in FIG. 1 could not accommodate more than six sockets 26. While this may be acceptable for some installations, it is inadequate for others.

Figure 2:
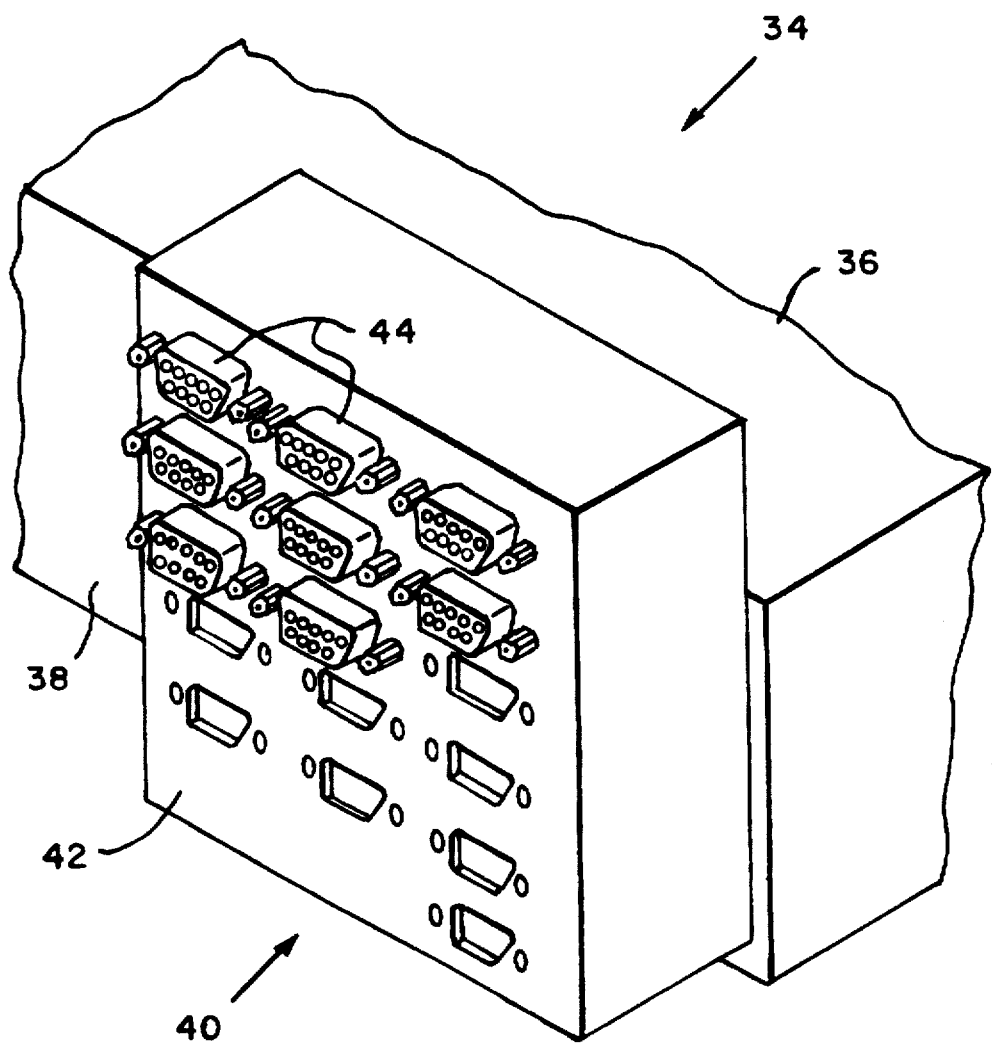
FIG. 2 is a fragmentary perspective view of a portion of the view shown in FIG. 1 illustrating another prior art method of mounting multiple input connecting devices on the rear wall.

FIG. 2 illustrates the other prior art approach to solving the problem of providing a large number of input connector devices on the rear wall of a computer chassis. Thus, the fragmentary representation of a computer, indicated generally by the reference numeral 34, is provided with a housing 36 and a chassis, which is represented by the rear wall 38, similar to the corresponding parts shown in FIG. 1. A generally rectangular box, indicated generally by the numeral 40, is mounted on the rear wall 38 over a plurality of slots (not shown) which correspond to the slots 22 shown in FIG. 1, and includes a front wall 42 on which are mounted a plurality of input socket connectors 44, which are substantially identical to the input socket connectors 26 shown in FIG. 1, and are mounted on the wall 42 in much the same manner. It will be apparent that the box 40 is an obtrusive addition to the back of the computer which may or may not fit within the boundaries of the height of the rear wall 38, and it also may or may not interfere with access to other components also mounted on the rear wall 38 depending on the configuration of the location of these components on the rear wall 38. And, as mentioned above, there are often gaps or openings between the rear wall of the box 40 and the rear wall 38 of the computer chassis that permit radiation emissions to escape from the housing 36, thereby preventing the box from meeting FCC requirements.

Figure 3:
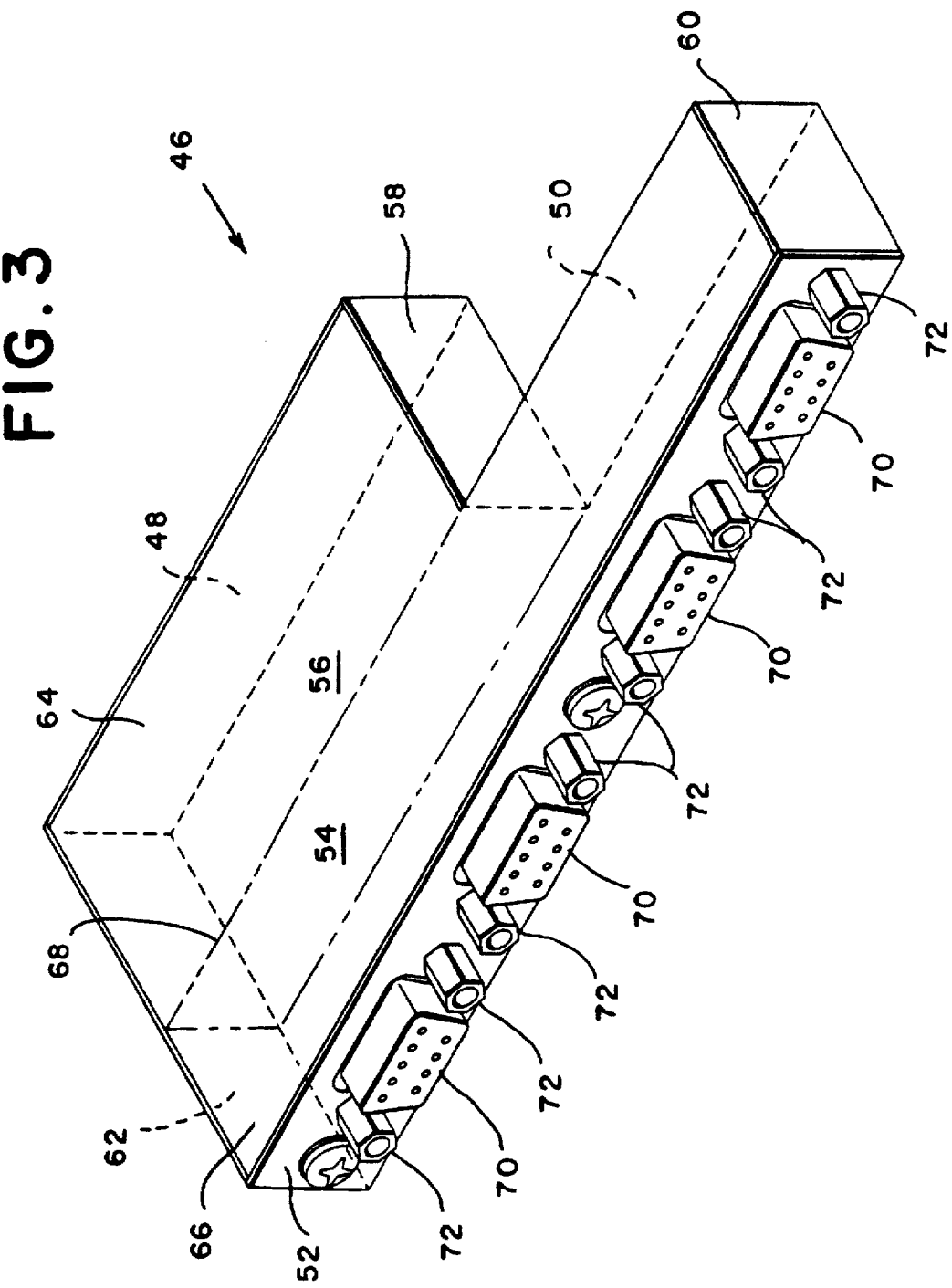
FIG. 3 is a perspective view of the interface multiple input connecting device of the present invention.
Figure 4:
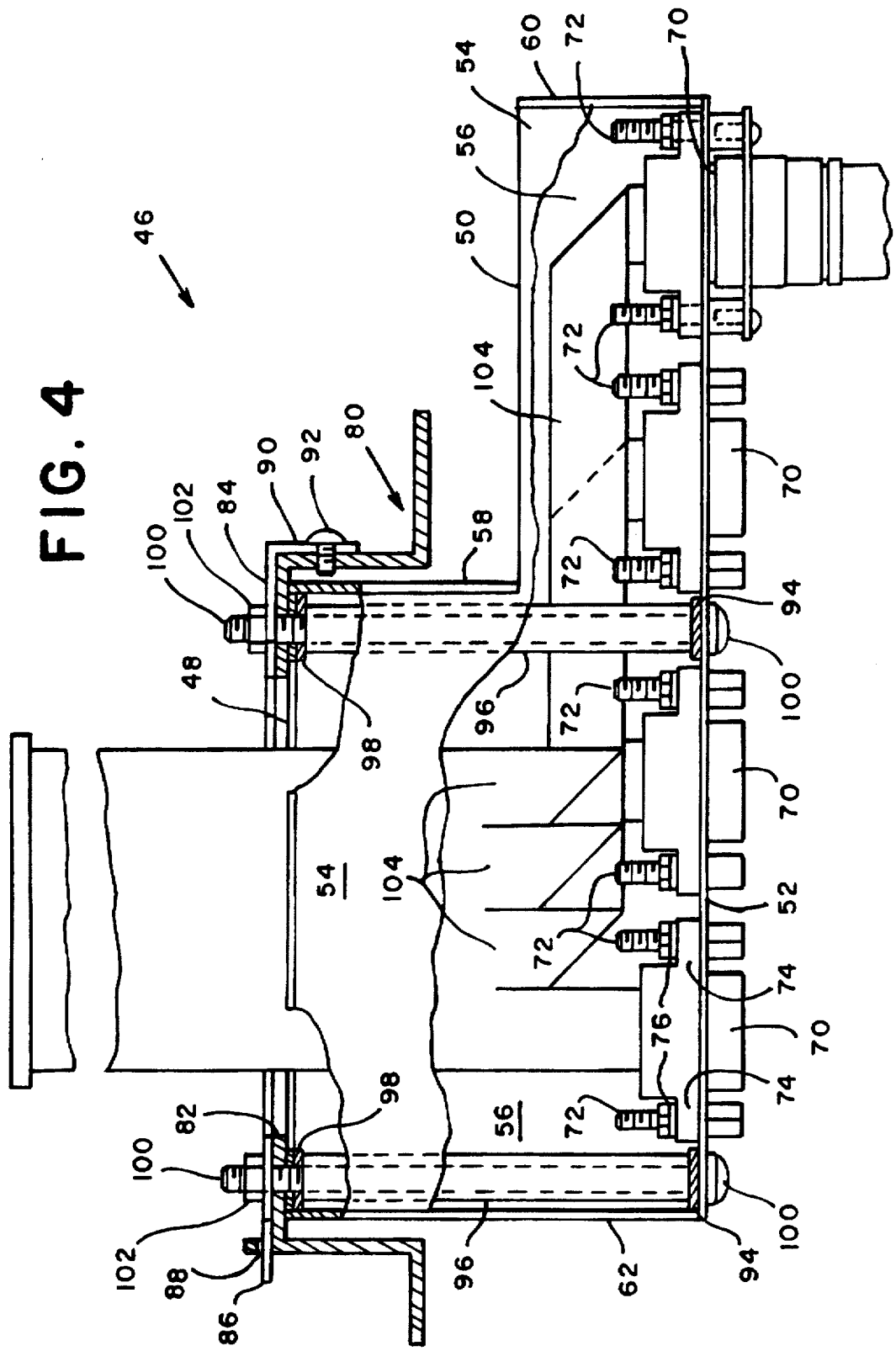
FIG. 4 is a plan view, with the top cover partly broken away to show detail, of the multiple input connecting device shown in FIG. 3, including fragmentary portions of the connection of the connecting device to the rear wall of the computer, and also showing the interior wiring of the connecting device.

The interface multiple input connecting device of the present invention is shown in FIG. 3 and in FIG. 4, and is indicated therein generally by the reference numeral 46. The connecting device 46 is constructed as a housing which is defined by opposed rear walls 48 and 50, and a front wall 52, opposed top and bottom walls 54 and 56, and opposed end walls 58, 60 and 62. Thus, it will be seen that the aforementioned walls define a configuration in which the housing 46 is divided into a first or rearward rectangular housing portion 64 defined by the rear wall 48, end wall 58 and a rearward portion of the wall 62, and rearward portions of the top and bottom walls 54 and 56 as delineated by the phantom line plane 68. The length of this portion 64, as defined by the rear wall 48, is substantially equal to the length of the expansion slots on the computer chassis. The housing 46 also has a second or forward rectangular housing portion 66 defined the front wall 52, the rear wall 50, end wall 60 and the remaining portion of the other end wall 62, and the forward portions of the top and bottom walls 54 and 56, again as delineated by the phantom line plane 68. The length of this portion 66 is substantially longer than the length of the first rectangular portion 64, which length will depend on the number and size of connecting devices to be mounted in this portion 66 of the housing 46, as will be further described below.

A plurality of input socket devices 70, which are substantially identical to the input socket devices 26 shown in FIG. 1, are mounted on the rear wall 52 of the device 46, such that they are effectively located in the second or forward portion 66 of the housing, and they are secured to the front wall 52 by means of screws 72 which pass through the wall 52 and through apertures in wings 74 which project out from a rear portion of the body of the input connecting devices 70, which are then secured by suitable nuts 76 threaded onto the screws 72.

As best seen in FIG. 4, the connecting device 46 is mounted on the rear wall portion of the computer chassis adjacent one of the standard expansion slots provided by the computer manufacturer. Thus, the rear wall portion of the computer chassis, indicated generally by the reference numeral 80, defines the aforementioned expansion slot 82. An elongate plate 84 is disposed on the inner surface of the chassis wall 80 and has a tab 86 which fits into a suitable slot 88 formed on a side portion of the chassis wall 80 so as to capture the tab 86 of the plate 84. The other end of the plate 84 is provided with another tab 90 which is bent at a 90° angle to the plate 82 and is secured to a an opposite side portion of the chassis wall 80 as by the screw 92, so that the plate 84 is thereby effectively secured to the chassis wall 80.

The upper wall 54, which is effectively a cover member for the housing 46, is provided with depending walls which correspond to the upstanding walls formed on the bottom wall 56 which actually define the housing 46, with the exception of the front wall 52, where the upper wall or cover 54 has only a pair of flanges 94 which extend downwardly from the surface of the upper wall 54 toward the bottom wall 56. A pair of elongate tubular elements 96 extend from the flanges 94 to the depending wall 98 of the cover 54 which lies just inside of the upstanding wall 48 of the bottom wall 56, and are permanently attached to the flanges 94 and the wall 98. A pair of elongate screws 100 extend through apertures in the front wall 52 and the flanges 94, and then through the tubular elements 96, then through apertures in the depending wall 98 of the cover 54, the upstanding wall 48 of the bottom wall 56, the rear chassis wall 80 and the elongate plate 84. The screws 100 are threaded into internally threaded members 102 suitably attached to or formed integrally with the plate 84.

With this arrangement, the tubular elements 96 provide a rigid connection between the depending flanges 94 and the rear wall 98 of the cover portion 54, and they prevent the screws 100 from inadvertently engaging with any portion of the flexible ribbon wires 104 disposed within the housing 46. Also, the portions of the chassis wall 80 adjacent the slot 82 are captured between the outer surface of the wall 48 and the inner surface of the elongate plate 84, thereby providing a very strong and rigid connection between the housing 46 and the chassis wall 80. Further, the combination of the walls 48 and 98 on the connecting device 46 provide an emissions proof seal with the chassis wall 80 to prevent emissions from escaping from the interior of the computer housing.

Figure 5:
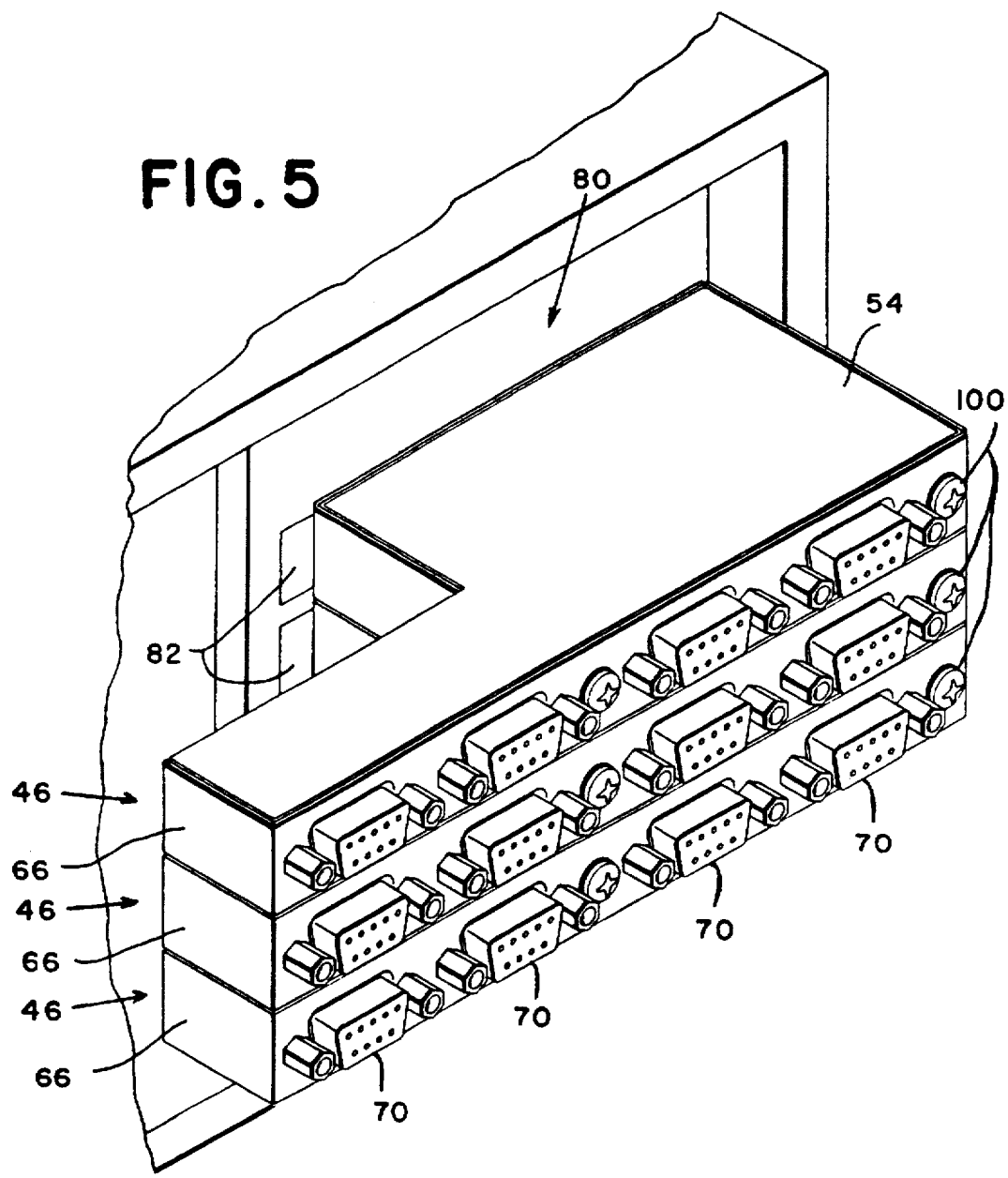
FIG. 5 is a perspective view showing three of the multiple input connecting device mounted on the back of the computer.

FIG. 5 illustrates the versatility of the connecting device 46 of the present invention when installed on the rear chassis wall of a computer. Thus, if a particular computer has three expansion slots 82, it is possible to mount three connecting devices 46 to the chassis wall 80, thereby increasing the input connection capacity from 6 to 12. And, as briefly mentioned above, it is entirely possible to make the forward housing portion 66 longer than what those in the drawing so that more than four connectors 70 can be mounted in each connecting device 46. Further, in the event that the forward portions 66 of the connecting devices 46 would interfere in any way with any other connecting component mounted on the chassis wall, any of the connecting devices 46 can be disconnected from the chassis wall, rotated 180° and reattached, so that the projecting forward portions 66 would extend in the opposite direction from that shown in FIG. 5.

FIG. 6 illustrates another embodiment of the connecting device 46 in which the rearward portion 64 of the device 46 is centrally located with respect to the forward portion 66 rather than offset to one side as shown in FIGS. 3 through 5, thereby further illustrating the versatility of the connecting device 46 in avoiding interference problems with other components on the back of the computer.

It is to be understood that the present invention is not to be considered as limited to the specific embodiments described above and shown in the accompanying drawings, which are merely illustrative of the best modes presently contemplated for carrying out the invention and which are susceptible to such changes as may be obvious to one skilled in the art, but rather that the invention is intended to cover all such variations, modifications and equivalents thereof as may be deemed to be within the scope of the claims appended hereto.

What is claimed is:

1. A computer interface multiple connecting device for connecting a plurality of peripheral devices to a computer having a plurality of standard elongate expansion slots provided in a rear wall of the chassis of the computer, said device comprising:

(a) a plurality of opposed front and rear, top and bottom and end walls defining a hollow housing, said housing having approximately the same thickness as one of said standard expansion slots;

(b) means on said rear wall of said housing for connecting said housing to the rear wall portion of the computer chassis adjacent one of said standard expansion slots; wherein said walls define a first rectangular housing portion which has a length approximately the same as the length of the expansion slot on the computer, and a second rectangular housing portion which has a length substantially longer than the length of the expansion slot on the computer, said plurality of input connector sockets being mounted in said second rectangular housing portion;

(c) means on said front wall of said housing for connecting a plurality of input connector sockets to said housing, whereby a corresponding plurality of input connector plugs attached to computer peripheral devices can be attached to said input connector sockets on said housing within the space occupied by a single standard expansion slot of the computer; and wherein said means for connecting said housing to the rear wall portion of the computer chassis further comprises:

(i) bracket means adapted to be mounted on the inside surface of said rear wall portion of the computer chassis adjacent said expansion slot; and (ii) means for removably connecting said rear wall of said first rectangular portion of said housing to said bracket means.

2. A computer interface multiple connecting device as set forth in claim 1, wherein said means for removably connecting said rear wall of said first rectangular portion of said housing to said bracket means comprises a plurality of elongate connector elements which extend from said front wall of said second rectangular housing portion to said rear wall of said first rectangular housing portion, and means on said bracket means for operative connection with said connector elements.

3. A computer interface multiple connecting device as set forth in claim 2 wherein one of said top and bottom walls includes tubular elements extending from said front wall of said second housing portion to said rear wall of said first housing portion through which said connector elements extend to prevent said connector elements from inadvertently engaging with wires in said housing connected to said input connector sockets.

4. A computer interface multiple connecting device as set forth in claim 1, wherein said device is detachable and rotatable so that a portion of said device extending beyond the corresponding surface of said single standard expansion slot can be rotated at the convenience of a device user.

5. A computer interface multiple connecting device as set forth in claim 1, wherein said device further comprises a ribbon cable for communicating data and/or transmitting power from said device to said computer, said ribbon cable further being segmented wherein said ribbon cable comprises a plurality of segments wherein each of said segments corresponds to an input/output connection on said device.

* * * * *